UNITED STATES PATENT OFFICE.

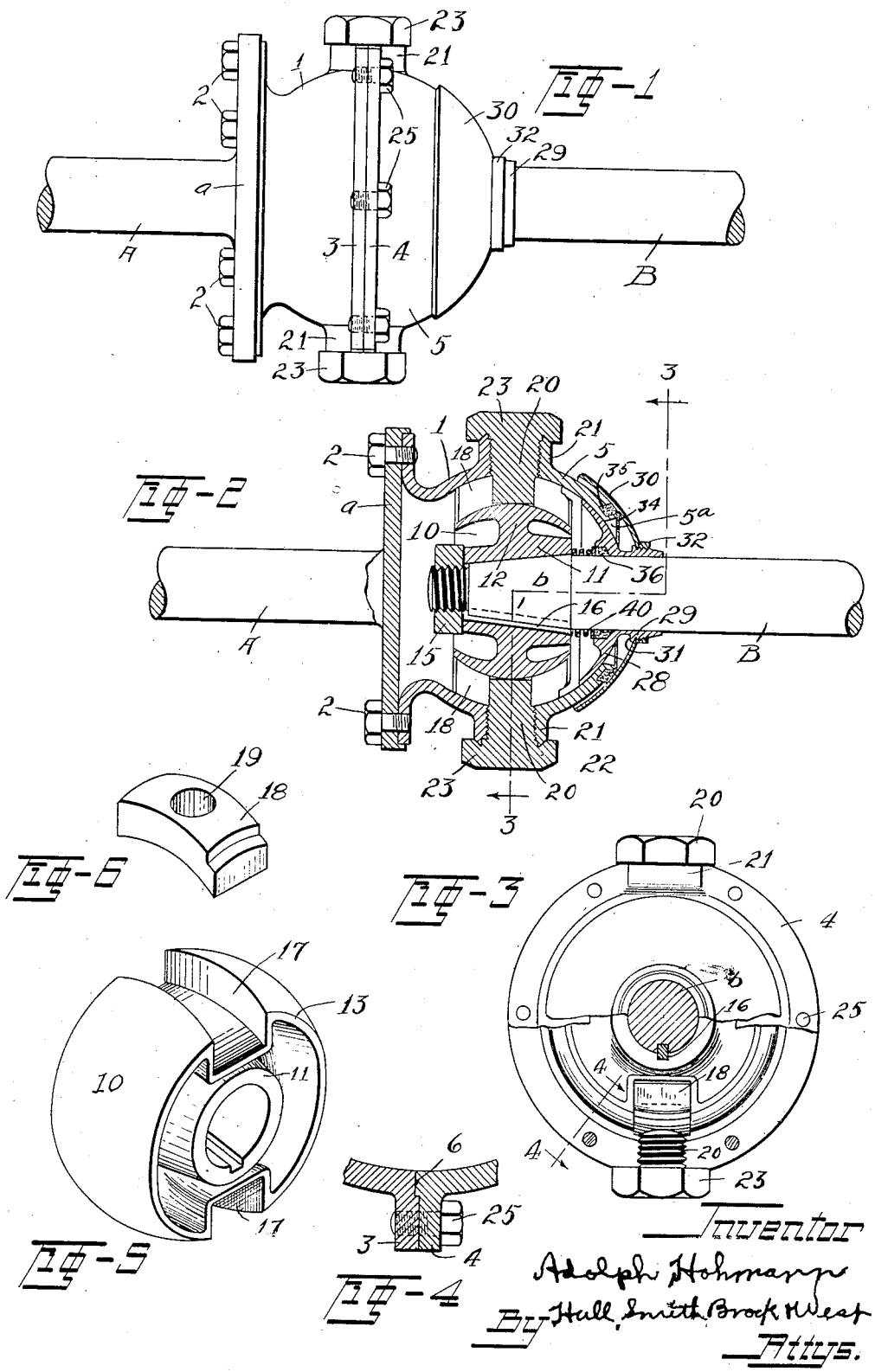

ADOLPH HOHMANN, OF CLEVELAND, OHIO, ASSIGNOR OF ONE-HALF TO HENRY KREIKENBOHM, OF CLEVELAND, OHIO; H. C. HOHMANN ADMINISTRATOR OF SAID ADOLPH HOHMANN, DECEASED; HELLMUTH C. HOHMANN, AS ADMINISTRATOR, ASSIGNOR OF ONE-HALF OF THE ENTIRE RIGHT TO HELLMUTH C. HOHMANN, OF LAKEWOOD, OHIO.

UNIVERSAL JOINT.

1,355,603.      Specification of Letters Patent.      Patented Oct. 12, 1920.

Application filed February 11, 1918. Serial No. 216,492.

*To all whom it may concern:*

Be it known that I, ADOLPH HOHMANN, a subject of the Emperor of Germany, residing at Cleveland, in the county of Cuyahoga and State of Ohio, have invented a certain new and useful Improvement in Universal Joints, of which the following is a full, clear, and exact description, reference being had to the accompanying drawings.

This invention relates to improvements in universal joints, the general objects being to provide a strong and compact joint of this character that operates easily and noiselessly at all angles within the range of relative movement between its opposed elements, and that is thoroughly incased against the admission of dust and the emission of oil and grease.

Accessibility of parts; ease of assembling and disassembling; lightness without sacrifice of strength; and minimizing of wear, are further objects comprehended by my invention.

These several objects and others which will become apparent as this description proceeds are attained in the construction illustrated in the accompanying drawing wherein Figure 1 is a side elevation of my improved universal joint; Fig. 2 is a central section through the joint on a plane parallel to that of Fig. 1; Fig. 3 is a section taken substantially on the line 3—3 of Fig. 2; Fig. 4 is a sectional detail on the correspondingly numbered line of Fig. 3; Fig. 5 is a perspective view of the inner member of the joint; and Fig. 6 a similar view of one of the shoes.

Proceeding with a detailed description of the invention, A and B are shaft sections that are connected by the joint, the former having a flange $a$ to which the outwardly flared open end of a semi-spherical casing member 1 is connected by fastening means 2, shown as screws. The other end of the casing member 1 is provided with a flange 3 for engagement with the flange 4 of a similar casing member 5, one of said flanges having a slight annular extension 6 which fits within a correspondingly shaped recess of the other flange, as indicated in Fig. 4. The casing member 5 has a central aperture $5^a$ through which the end of the shaft section B enters the casing, the aperture being enough larger than the shaft to permit considerable angular movement of the shaft with respect to the casing. The inner end of the shaft section B may be tapered, as shown at $b$, for the application of the inner member 10 of the joint (the outer member of the joint as I may term it, being composed of the casing members 1 and 5).

The inner member 10 consists preferably of a steel forging and is composed of a hub 11, a central transverse web 12, and a rim 13. The bore of the hub is tapered to fit the end of the shaft section B and is held thereon by a nut 15 that is applied to the end of the shaft, the shaft and member 10 being held against independent rotation by a key 16. Diametrically opposite portions of the rim 13 are inset to provide channels 17; and shoes 18 having a sliding fit within these channels. Each shoe has an aperture 19 for the reception of the reduced inner end of a screw 20; and these screws are threaded through diametrically opposed split bosses 21 that are divided equally between the casing members 1 and 5 and constitute, in effect, enlargements of the flanges 3 and 4. The outer ends of the bosses 21 are frusto-conical to fit within correspondingly shaped annular grooves that are formed on the inner faces of the heads 23 of the screws 20. Thus the screw heads assist in holding the casing members 1 and 5 against separation, the flanges 3 and 4 of the casing members being connected between bosses by fastening means 25, shown as screws that pass freely through the flange 4 and are threaded into flange 3.

To thoroughly close the opening 6 of the casing against the admission of dust or dirt, and the emission of lubricant contained within the casing, I employ a closure 28 that is curved to fit the inner wall of the casing member 5 adjacent the opening 6 and which has a sleeved hub 29 that bears upon the shaft section B and projects out through the opening 6. A shell 30 is applied to the outer end of the hub 29 and is held against a flange 31 thereof by a nut 32 that is screwed upon the hub, the shell 30 extending out over the casing member 5 to bear upon a washer 34 of suitable packing material, contained within an annular groove 35 of the casing member. A washer 36, of suitable packing material, is also inserted between the inner end of the hub 29 and the shaft section. These packing washers insure tight joints at their respective locations. A compression spring 40 is inserted between the hub of the inner member 10 and the packing washer 36, to maintain the packing washer under compression and closure 28 against the wall of the casing member 5.

Having thus described my invention, what I claim is:—

1. A universal joint comprising a casing adapted for connection to an element and having an opening opposed thereto, a member within the casing adapted for fixed connection to a shaft entering the casing through said opening, operative connections between the member and the casing permitting angular movement between the shaft and element while maintaining them against independent rotation with respect to each other, a closure within the casing for coöperation with a portion thereof about the opening, and a cap opposed to said closure and extending over the outer end of the casing for coöperation therewith, the cap and closure being carried directly by the shaft for movement therewith.

2. A universal joint comprising an outer member having a spherical chamber; an inner member composed of a hub and a rim, connected by a radial web, the rim conforming in shape to the inner wall of the casing and having diametrically opposed inset portions forming channels; shoes slidable within said channels; and pivotal connections between said shoes and the outer member.

3. A universal joint comprising an outer member having a spherical chamber; an inner member composed of a hub and a rim, connected by a radial web, the rim conforming in shape to the inner wall of the casing; and connections between the inner and outer members that are slidable with respect to one and rotatable with respect to the other.

In testimony whereof, I hereunto affix my signature.

ADOLPH HOHMANN.